Oct. 2, 1951 W. E. ARNOLD ET AL 2,569,794
FEED WORKS FOR SAWMILLS
Filed Nov. 23, 1949 3 Sheets-Sheet 1

Inventors
Walter E. Arnold
George R. Caton

By
*Clarence A. O'Brien
and Harvey B. Jacobson*
Attorneys

Oct. 2, 1951  W. E. ARNOLD ET AL  2,569,794
FEED WORKS FOR SAWMILLS
Filed Nov. 23, 1949  3 Sheets-Sheet 2
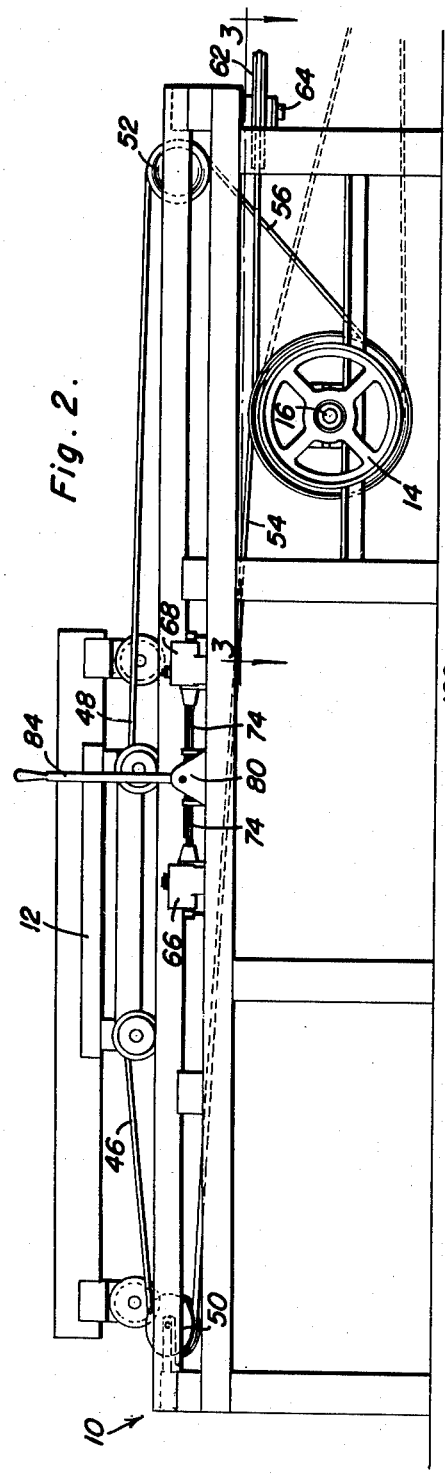
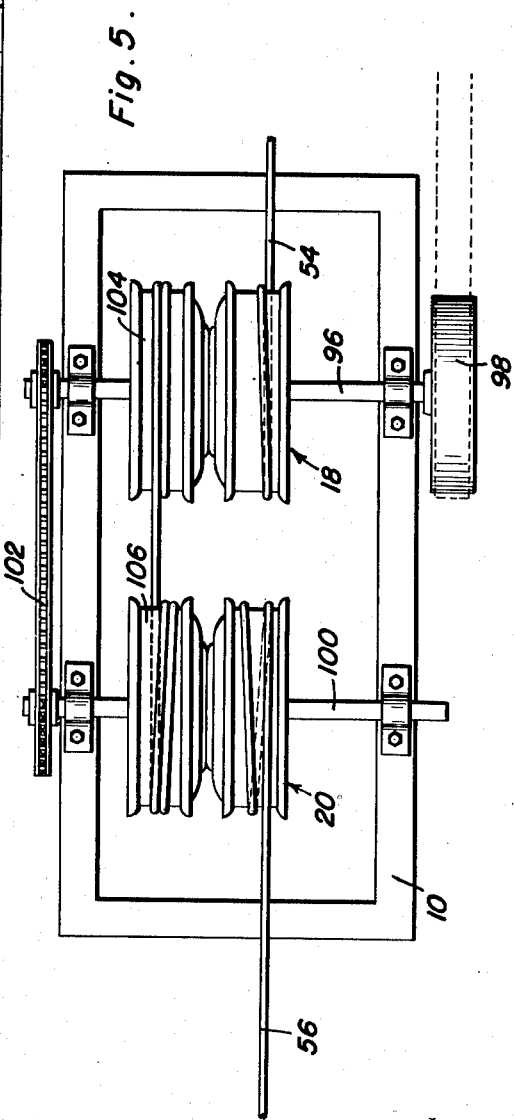
Inventors
Walter E. Arnold
George R. Caton
By *Clarence A. O'Brien
and Harvey B. Jacobson*
Attorneys

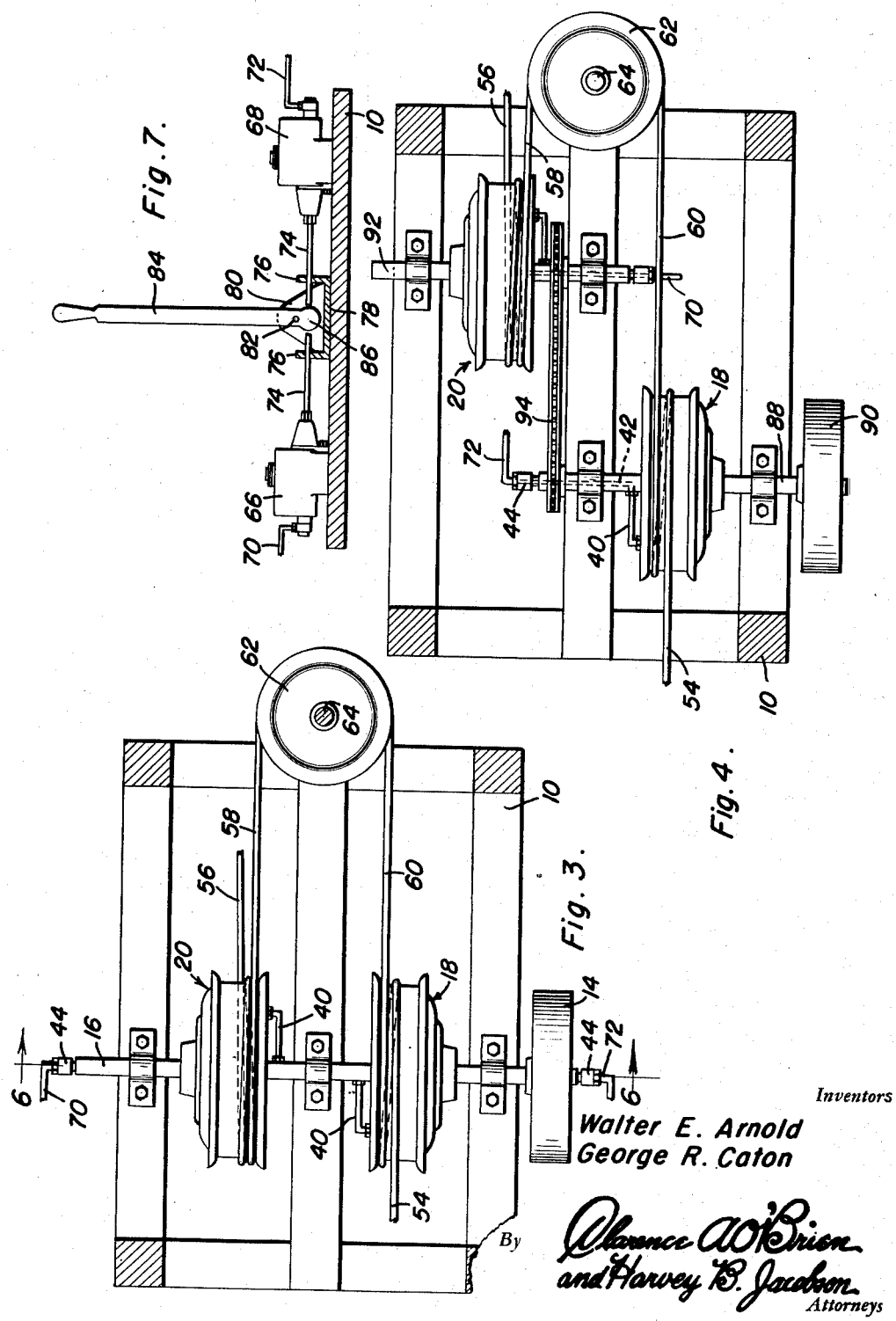

Patented Oct. 2, 1951

2,569,794

UNITED STATES PATENT OFFICE 2,569,794

FEED WORKS FOR SAWMILLS

Walter E. Arnold and George R. Caton, Crockett, Tex.

Application November 23, 1949, Serial No. 128,976

6 Claims. (Cl. 74—27)

This invention comprises novel and useful improvements in a feed works for a saw mill and more specifically pertains to an improved power transmitting mechanism for controllably coupling a continuously and unidirectionally rotating power shaft with a reciprocating saw mill carriage.

The primary object of this invention is to provide an improved feed works for saw mills for more effectively, durably, dependably and controllably transmitting power from a power source to a reciprocable saw mill carriage.

A further important object of the invention is to provide an improved feed works for saw mills in accordance with the foregoing object wherein the reciprocable saw mill carriage may be readily reversed in its movement while being operated from a continuous, unidirectional source of power.

A still further important object of the invention is to provide an improved feed works in conformity with the preceding objects which may be economically constructed from conventional structural machine elements such as are commonly employed in connection with conventional motor vehicles, thereby greatly minimizing the cost of fabricating the device, as well as the ease and simplicity of servicing the same. And a final important feature and object of the invention to be specifically enumerated herein, is to provide an improved feed works for saw mills in accordance with the various foregoing objects which shall have an improved control mechanism for selectively applying power from a continuously and unidirectionally rotating power source to move the saw mill carriage in either direction of this reciprocation; to incorporate the well known advantages of a hydraulic clutch actuating mechanism in the aforesaid feed works;

And generally to provide a less expensive, more serviceable and more dependable reversible operating mechanism for a saw mill carriage.

These, together with various ancillary features and objects of the invention which will later become apparent as the following description proceeds, are attained by the present invention, a preferred embodiment of which has been illustrated by way of example only in the accompanying drawings, wherein:

Figure 2 is a side elevational view of the arrangement shown in Figure 1;

Figure 3 is a horizontal sectional view taken substantially upon the plane of the section line 3—3 of Figure 2 and illustrating a suitable arrangement of the forward and reverse drums and their engagement by the carriage operating cable of the device;

Figure 4 is a view similar to Figure 1 but showing a modified construction of drums and their operating mechanism;

Figure 5 is a top plan view showing a still further embodiment of the elements of Figures 3 and 4;

Figure 1:
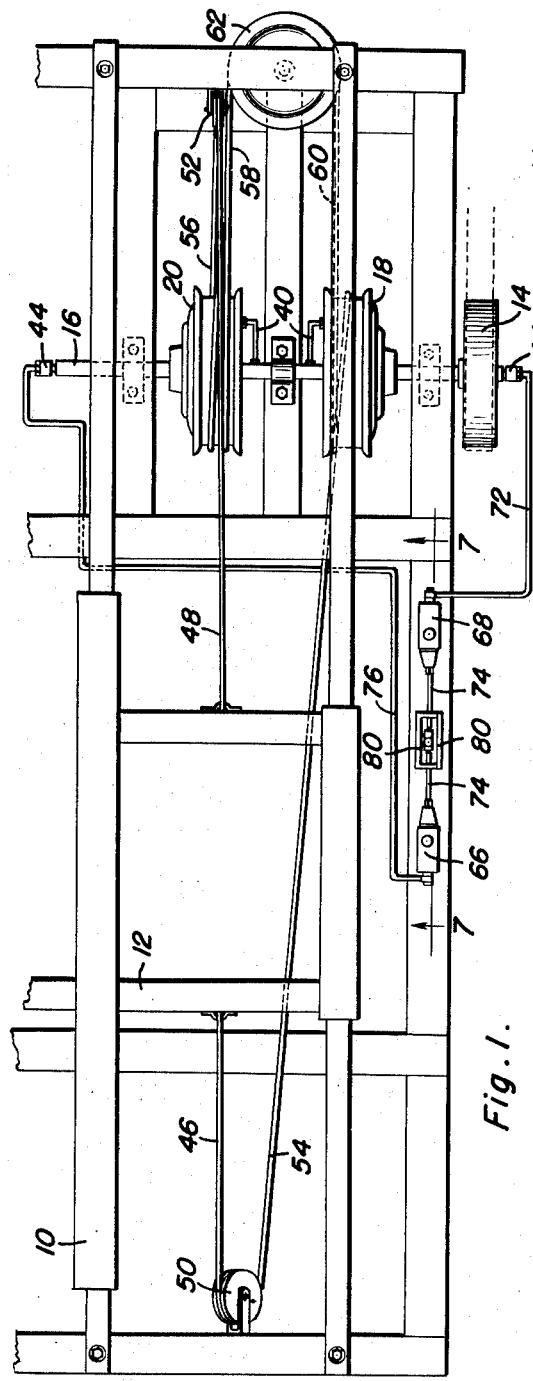
Figure 1 is a top plan view of a suitable embodiment of apparatus for carrying out the principles of the invention.
Figure 6:
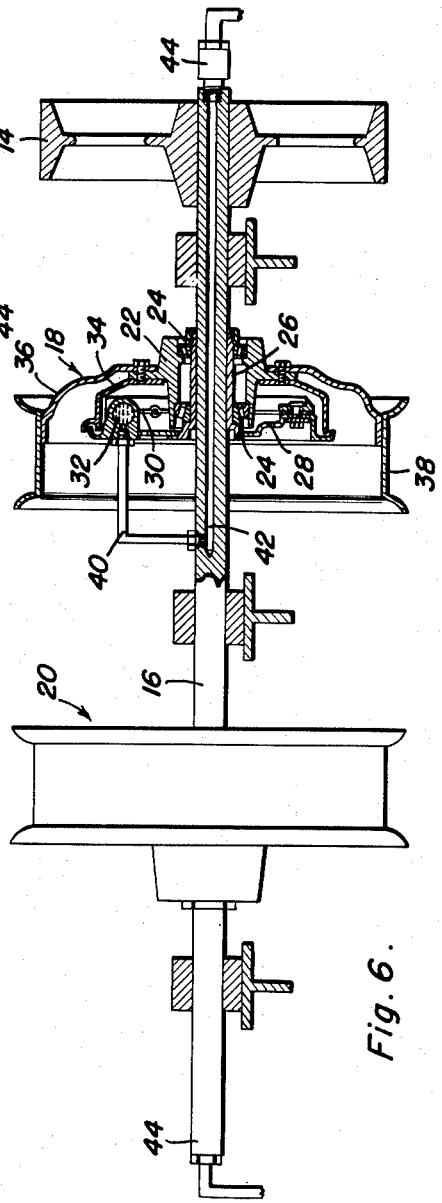

Figure 6 is a vertical transverse sectional view taken substantially upon the plane indicated by the section line 6—6 of Figure 3 and illustrating the construction of one of the hydraulic clutch members for controlling the operation of a drum together with a hydraulic conduit connection for the same; and, Figure 7 is a vertical longitudinal sectional view, taken substantially upon the plane indicated by the section line 7—7 of Figure 1, and showing the common control means for operating the hydraulic clutches of the invention.

Referring now more specifically to the accompanying drawings, wherein like numerals designate similar parts throughout the various views, attention is directed first to the embodiment illustrated in Figures 1–3, 6 and 7. In this embodiment, there is illustrated any suitable conventional saw mill framework 10, having a conventional saw mill carriage 12 suitably mounted thereon for reciprocating guided movement. In conventional practice, it is customary to provide means for controlling the reciprocation of this saw mill carriage during its operation, and this control or operating means necessarily requires the provision of mechanism to effect reverse movement of the carriage during its rectilinear reciprocation, while necessarily operating the carriage from a unidirectional source of power, such as a suitable engine of any desired type, not shown.

In accordance with the present invention, a feed works is provided wherein power from any suitable source, not shown, is applied to a driven pulley 14 rigidly attached to and carried by a power shaft 16 which is mounted in any desired manner transversely of the saw mill framework 10. The power shaft 16 is thus driven at a constant speed and continuously in a single direction of revolution or in a unidirectional manner. The present invention utilizes a pair of drums or reels 18 and 20 which as shown are respectively employed as the forward and reverse drums.

As shown more particularly in Figures 3 and 6, each of the drums is provided with a hub portion 22 rotatably journaled upon the power shaft 16 in any suitable manner such as by anti-friction bearings 24, the latter being in turn journaled upon the hub portion 26 which is fixedly secured to the power shaft 16 in any desired manner for rotation therewith, this latter hub portion having attached thereto a brake shoe carrier plate 28 upon which are mounted suitable brake shoes 30 of any desired type and operated by hydraulic actuated cylinders of any conventional construction, one being indicated generally at 32.

Fixedly carried by the hub 22 is a brake drum 34 and a disk 36 carrying the annular member 38 which constitutes a cable drum or winch.

It should be here noted that in the interest of economy as well as in view of the advantages of ready servicing and easy and abundant source of material, the members 22, 36 and 38 may conveniently comprise the truck wheel of the well known Ford and Chevrolet trucks; the member 34 may consist of a brake drum of the same; while the brake shoe carrier plate, its hub and the hydraulic actuating means may constitute parts of a conventional hydraulic brake actuating mechanism of motor vehicles. Since these parts are all of well known construction and are readily available, the details of construction of these elements form in themselves no part of this invention, are well known to those skilled in the art, and hence it is believed unnecessary to illustrate or further describe the details of the same.

However, it will be seen that upon rotation of the power shaft 16, and upon actuation of the hydraulic cylinders 32, and through these members the expanding of the brake shoes against the brake drums, the same will constitute a fluid or hydraulic clutch by means of which the drums 38 are clutched or locked to the power shaft 16 for rotation therewith. Upon release of the hydraulic operating pressure in the hydraulic brake system, the clutch member will then be released, whereupon the drums 38 will be free to rotate independently of the power shaft 16 for a purpose which will be later apparent.

Obviously, any suitable means may be provided for controllably supplying fluid pressure to the brake cylinders 32, a satisfactory arrangement being illustrated in Figure 6. In this arrangement, each of the drums has a pipe 40 connected with the hydraulic cylinder 32, and to the interior of the power shaft 16 to communicate with an axial or longitudinally extending fluid conduit 42 therein, the end of this conduit emerging through the corresponding end of the power shaft for engagement with a suitable swiveling coupling 44 by means of which the conduit is connected to a source of hydraulic pressure as set forth hereinafter. It will be understood that each of the drums has an identical connection, and that the ends of the conduits extend through opposite ends of the power shaft, the construction of only one of these conduits being illustrated.

Referring now again to Figures 1–3, it will be seen that the opposite ends of the carriage 12 are connected to the two end portions 46 and 48 of a cable, the latter being entrained over a pair of swiveling guide pulleys or sheaves 50 and 52 which are mounted upon opposite ends of the saw mill framework 10, the mid-portion of the cable extending from the pulleys 50 and 52, by means of portions 54 and 56, for several turns about each of the two drums, and thence by means of portions 58 and 60, is entrained about an idler pulley 62 journaled upon a suitable axle 64 carried by one extremity of the saw mill framework 10.

As so far described, it will now be seen that when the driving pulley 14 and hence the power shaft 16 are driven from any suitable power source, that by enagement of the proper hydraulic clutch mechanism, the corresponding drum will be connected with the power and thus cause a pull from one of the selected cable portions 54 or 56 to thereby move the carriage in the desired direction. As one cable is operated by its corresponding drum, the portion of the cable entrained over the other drum is free to rotate said other drum in a reverse direction, any slack in the cable being eliminated by the idler pulley 62. Upon engaging the other drum, a reverse direction of rotation is effected since the pull of this drum upon the cable will directly urge the carriage 12 in the opposite direction.

Thus, power may be selectively applied in an alternative manner to the two drums to selectively and alternately move the carriage in opposite directions from a continuously and unidirectional rotating power shaft.

Referring now more specifically to Figures 1 and 7, it will be seen that the means for controllably applying the hydraulic pressure to the hydraulic clutches of the drums consists of a pair of hydraulic actuating cylinders 66 and 68 which may be of any known construction such as the well known hydraulic brake actuating cylinders of motor vehicles, these cylinders being respectively connected as by conduits 70 and 72 with the opposite ends of the conduits 42 in the power shaft 16 through the above mentioned rotatable or swiveling connections 44. The actuating cylinders include the customary actuating rods 74 which terminate in spaced and aligned relation with respect to each other as shown in Figure 7, the cylinders being conveniently mounted upon any suitable portion of the framework 10.

Preferably, the two actuating rods 74 have their ends slidably received in the end walls 76 of a U-shaped bracket 78 which is likewise mounted upon the framework 10 between the actuating cylinders. The bracket 78 further is provided with an upstanding lug 80, to which is pivoted as at 82 a manual control lever 84, having a cam portion 86 at its lower end disposed between the adjacent ends of the rods 74. The arrangement is such that when the rod is in its neutral or middle position, as shown in Figure 7, the cam 86 is disengaged from each of the extremities of the rods 74; but when the control handle 84 is moved into either of its end positions, a corresponding one of the rods 74 and consequently, one of the actuating cylinders 66 and 68 is operated. The actuation of this cylinder serves to displace hydraulic fluid through the above mentioned conduits 72 and 74 and thereby actuate the respective hydraulic coupling to thereby selectively couple one of the drums rigidly to the power shaft for operation thereby. Obviously, the movement of the handle 84 in the opposite direction will release the first mentioned cylinder, permitting the usual brake return springs, not shown, to release the brake shoe forming the clutch member of that drum, thereby forcing the hydraulic fluid to return to the corresponding actuating cylinder, while the other actuating cylinder is in turn operated.

While the embodiment thus far described is satisfactory for installations which permit the power shaft to be sufficiently long to accommodate both of the drums in spaced position thereon, the principles of the invention are likewise applicable to constructions wherein the necessary lateral width of the device is not available. For this purpose, an alternative arrangement of the drums may be employed as illustrated in Figure 4.

In the modified arrangement of Figure 4, it is to be understood that the same saw mill framework, carriage, cable, guide pulleys and idler pulley previously described are to be employed, together with the same source of power. Here, however, the power shaft 88 having a driven pulley 90 thereon for connection with the suitable source of power, does not extend entirely across the framework 10, but may conveniently extend across only a portion of the width of the same, being provided with a pulley 18 which is identical in all respects to that previously described. Over this pulley, is entrained the corresponding portion 54 of the cable, the portion 60 of the same being entrained over the idler pulley 62 as previously set forth. Likewise, the power shaft 88 is provided with the same fluid clutch construction set forth in connection with the preceding embodiment, including a fluid pressure pipe 40 which communicates with the conduit 42 disposed in the end portion of the power shaft 88, this latter conduit being connected by the above mentioned swiveling connector 44 with the hydraulic pressure conduit 72, all of the same construction previously described.

However, it will be noted that but one of the drums is attached to the power shaft 88, while the other drum 20 is similarly secured to a lay shaft 92 which is disposed parallel to the shaft 88, but in overlapping relation with respect to the same, and the overlapping or adjacent ends of the shafts 88 and 92 are connected together by any suitable means such as a sprocket chain drive 94. Thus, the two shafts are rotated continuously in the same direction, and are thus both driven from the same power source with a continuous and unidirectional rotation. It will now be seen that the previously described hydraulic mechanism can be employed to selectively energize the hydraulic clutches and thus alternatively apply the power to a selected drum to impart a desired direction or rectilinear motion to the saw mill carriage 12.

A still further modified construction is disclosed in Figure 5 wherein it will be seen that the framework 10 is provided with a power shaft 96 extending laterally across the framework and suitably journaled thereon, this power shaft being provided with a driving pulley 98 in the manner previously described.

A parallel lay shaft 100 is likewise journaled transversely of the framework 10 and the previously described drum, clutch and hydraulic operating mechanisms are employed. However, the adjacent free ends of the shafts 96 and 100 are connected by any suitable operative connection such as a sprocket chain or the like 102, to cause simultaneous and continuous rotation of these shafts in the same direction. The cable portions 54 and 56 are respectively wound about the drums 18 and 20 in reverse direction, and are connected as in the above mentioned arrangement to the opposite ends of the carriage 12. The mid-portions of the cable after being entrained over the drums 18 and 20, are entrained over idler drums or tensioning drums 104 and 106 carried by the assemblies 18 and 20.

In each of the embodiments and arrangements disclosed and described, it will be apparent that the cable portions are wound about the two drums in opposite directions so that upon rotation of the two drums in the same direction, the cables will be moved in reverse directions. Further, the mid-portion of each of the cables is entrained over an idler or tensioning pulley for taking up slack in the cable, and for maintaining tight frictional engagement of the cable convolutions wound around the respective drums, whereby rotation of the drums will effectively reciprocate the ends of the cables.

From the foregoing, it is felt that the construction and operation of the device together with the principles of the same will be readily apparent and accordingly, further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A feed works for a saw mill having a reciprocable carriage comprising forward and reverse drums rotatable in the same direction, a power shaft unidirectionally rotating at a constant speed, means selectively and alternatively operatively connecting said drums to said power shaft, a cable having its mid-portion wound reversely about said drums and having its ends connected to opposite ends of said carriage, a lay shaft, one drum being journaled on each of said shafts, an operative connection between said shafts.

2. A feed works for a saw mill having a reciprocable carriage comprising forward and reverse drums rotatable in the same direction, a power shaft unidirectionally rotating at a constant speed, means selectively and alternatively operatively connecting said drums to said power shaft, a cable having its mid-portion wound reversely about said drums and having its ends connected to opposite ends of said carriage, a lay shaft, one drum being journaled on each of said shafts, an operative connection between said shafts, said operative connection engaging corresponding ends of said shafts.

3. A feed works for a saw mill having a reciprocable carriage comprising forward and reverse drums rotatable in the same direction, a power shaft unidirectionally rotating at a constant speed, means selectively and alternatively operatively connecting said drums to said power shaft, a cable having its mid-portion wound reversely about said drums and having its ends connected to opposite ends of said carriage, a lay shaft, one drum being journaled on each of said shafts, an operative connection between said shafts, said shafts being parallel and spaced and having overlapping adjacent ends, said operative connection engaging said adjacent ends.

4. A feed works for a saw mill having a reciprocable carriage comprising forward and reverse drums rotatable in the same direction, a power shaft unidirectionally rotating at a constant speed, means selectively and alternatively operatively connecting said drums to said power shaft, a cable having its mid-portion wound reversely about said drums and having its ends connected to opposite ends of said carriage, said means including a clutch operatively connected with each drum and with said shaft, a hydraulic actuated cylinder operatively connected with each clutch, a pair of hydraulic actuating cylinders, a common actuating member associated with said actuting cylinders for alternate operation, hydraulic conduits connecting each actuating cylinder with an actuated cylinder, a lay shaft, one drum being journaled on each of said shafts, an operative connection between said shafts.

5. A feed works for a saw mill having a reciprocable carriage comprising forward and reverse drums rotatable in the same direction, a power shaft unidirectionally rotating at a constant speed, means selectively and alternatively operatively connecting said drums to said power shaft, a cable having its mid-portion wound reversely about said drums and having its ends connected to opposite ends of said carriage, said means including a clutch operatively connected with each drum and with said shaft, a hydraulic actuated cylinder operatively connected with each clutch, a pair of hydraulic actuating cylinders, a common actuating member associated with said actuating cylinders for alternate operation, hydraulic conduits connecting each actuating cylinder with an actuated cylinder, a lay shaft, one drum being journaled on each of said shafts, and operative connection between said shafts, said operative connection engaging corresponding ends of said shafts.

6. A feed works for a saw mill having a reciprocable carriage comprising forward and reverse drums rotatable in the same direction, a power shaft unidirectionally rotating at a constant speed, means selectively and alternatively operatively connecting said drums to said power shaft, a cable having its mid-portion wound reversely about said drums and having its ends connected to opposite ends of said carriage, said means including a clutch operatively connected with each drum and with said shaft, a hydraulic actuated cylinder operatively connected with each clutch, a pair of hydraulic actuating cylinders, a common actuating member associated with said actuating cylinders for alternate operation, hydraulic conduits connecting each actuating cylinder with an actuated cylinder, a lay shaft, one drum being journaled on each of said shafts, and operative connection between said shafts, said shafts being parallel and spaced and having overlapping adjacent ends, said operative connection engaging said adjacent ends.

WALTER E. ARNOLD.
GEORGE R. CATON.

REFERENCES CITED

The following references are of record in the file of this patent:

UNITED STATES PATENTS

| Number | Name | Date |
|---|---|---|
| 324,223 | Campbell | Aug. 11, 1885 |
| 1,633,920 | Bradford | June 28, 1927 |
| 2,241,142 | Kvalheim | May 6, 1941 |